(12) United States Patent
Henderson et al.

(10) Patent No.: US 11,644,549 B2
(45) Date of Patent: May 9, 2023

(54) EXTENDED DYNAMIC RANGE AND REDUCED POWER IMAGING FOR LIDAR DETECTOR ARRAYS

(71) Applicants: The University Court of The University of Edinburgh, Edinburgh (GB); Sense Photonics, Inc., Durham, NC (US)

(72) Inventors: Robert Henderson, Edinburgh (GB); Tarek Al Abbas, Edinburgh (GB); Neil Calder, Edinburgh (GB); Hod Finkelstein, Berkeley, CA (US)

(*) Notice: Subject to any disclaimer, the term of this patent is extended or adjusted under 35 U.S.C. 154(b) by 483 days.

(21) Appl. No.: 16/810,299

(22) Filed: Mar. 5, 2020

(65) Prior Publication Data

US 2020/0284884 A1   Sep. 10, 2020

Related U.S. Application Data

(60) Provisional application No. 62/908,801, filed on Oct. 1, 2019, provisional application No. 62/814,452, filed on Mar. 6, 2019.

(51) Int. Cl.
*G01S 17/931* (2020.01)
*G01S 7/499* (2006.01)
*G01S 7/4863* (2020.01)

(52) U.S. Cl.
CPC ............ *G01S 7/4863* (2013.01); *G01S 7/499* (2013.01); *G01S 17/931* (2020.01)

(58) Field of Classification Search
None
See application file for complete search history.

(56) References Cited

U.S. PATENT DOCUMENTS 8,476,571 B2 * 7/2013 Grazioso ................. G01T 1/248
250/214 R
10,483,722 B2 * 11/2019 Burroughs ............ H01S 5/3201
(Continued)

FOREIGN PATENT DOCUMENTS

| KR | 10-2018-0012059 A | 2/2018 |
| KR | 10-2018-0083983 A | 7/2018 |
| WO | 2017/143217 A1 | 8/2017 |

OTHER PUBLICATIONS

Yamazaki et al. "Four-Directional Pixel-Wise Polarization CMOS Image Sensor Using Air-Gap Wire Grid on 2.5-μm Back-Illuminated Pixels" 2016 IEEE International Electron Devices Meeting (IEDM) (pp. 220-223) (Dec. 3-7, 2016).
(Continued)

*Primary Examiner* — Irfan Habib
(74) *Attorney, Agent, or Firm* — Myers Bigel, P.A.

(57) ABSTRACT

A Light Detection And Ranging (LIDAR) detector circuit includes a plurality of detector pixels, where each or a respective detector pixel of the detector pixels includes a plurality of detector elements. At least one control circuit is configured to provide one or more detector control signals that selectively activate one or more of the detector elements of the respective detector pixel to define a first active detection area including a first subset of the detector elements for a first image acquisition, and a second active detection area including a second subset of the detector elements for a second image acquisition. Related devices and methods of operation are also discussed.

19 Claims, 11 Drawing Sheets

(56) References Cited

U.S. PATENT DOCUMENTS

| | | | |
|---|---|---|---|
| 11,287,517 B2* | 3/2022 | Dehlinger | G01S 17/894 |
| 11,294,058 B2* | 4/2022 | Dehlinger | G01S 17/86 |
| 11,467,286 B2* | 10/2022 | Finkelstein | G01S 7/4865 |
| 2017/0242102 A1* | 8/2017 | Dussan | G01S 7/4817 |
| 2017/0248796 A1* | 8/2017 | Banks | H04N 13/271 |
| 2018/0246189 A1* | 8/2018 | Smits | G01S 17/003 |
| 2018/0372496 A1* | 12/2018 | Laine | G02F 1/29 |
| 2019/0018117 A1* | 1/2019 | Perenzoni | G01C 3/08 |
| 2020/0284883 A1* | 9/2020 | Ferreira | G01S 17/10 |
| 2021/0109224 A1* | 4/2021 | Finkelstein | G01S 7/4815 |
| 2021/0190922 A1* | 6/2021 | Yu | G01S 17/89 |
| 2021/0286068 A1* | 9/2021 | Kumar | G01S 13/931 |
| 2022/0035010 A1* | 2/2022 | Caporale | G01S 7/4865 |
| 2022/0043128 A1* | 2/2022 | Pacala | G01S 17/10 |

OTHER PUBLICATIONS

Zhang et al. "A 30-frames/s, 252×144 SPAD Flash LiDAR With 1728 Dual-Clock 48.8-ps TDCs, and Pixel-Wise Integrated Histogramming" IEEE Journal of Solid-State Circuits 54(4):1137-1151 (Dec. 28, 2018).

Notification of Transmittal of the International Search Report and the Written Opinion of the International Searching Authority, or the Declaration, in corresponding PCT Application No. PCT/US2020/021109 (11 pages) (dated Jun. 24, 2020).

Extended European Search Report Corresponding to European Application No. 20766812.0 (9 pages) (dated Sep. 9, 2022).

\* cited by examiner

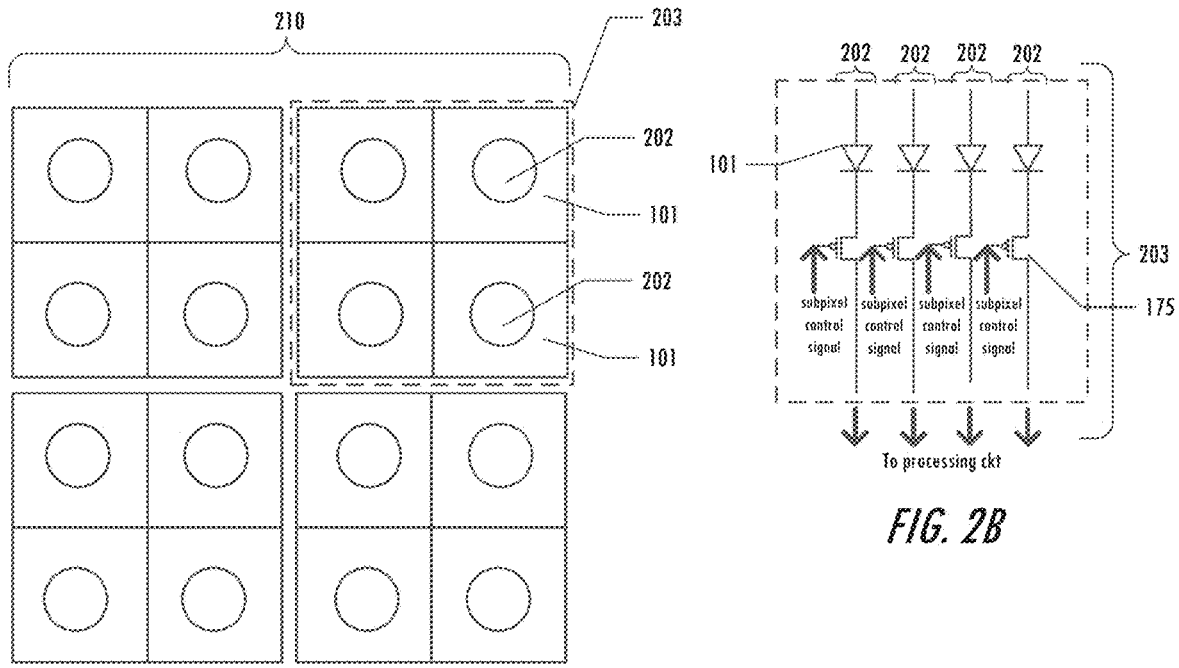
FIG. 2A
FIG. 2B
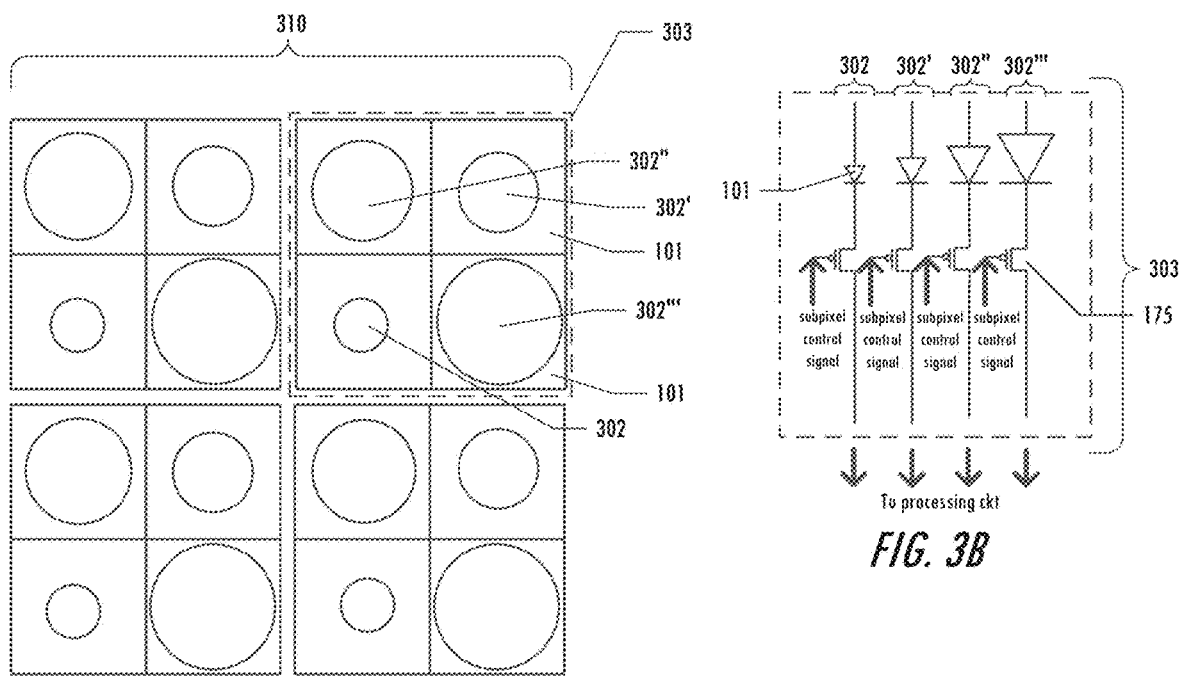
FIG. 3A
FIG. 3B

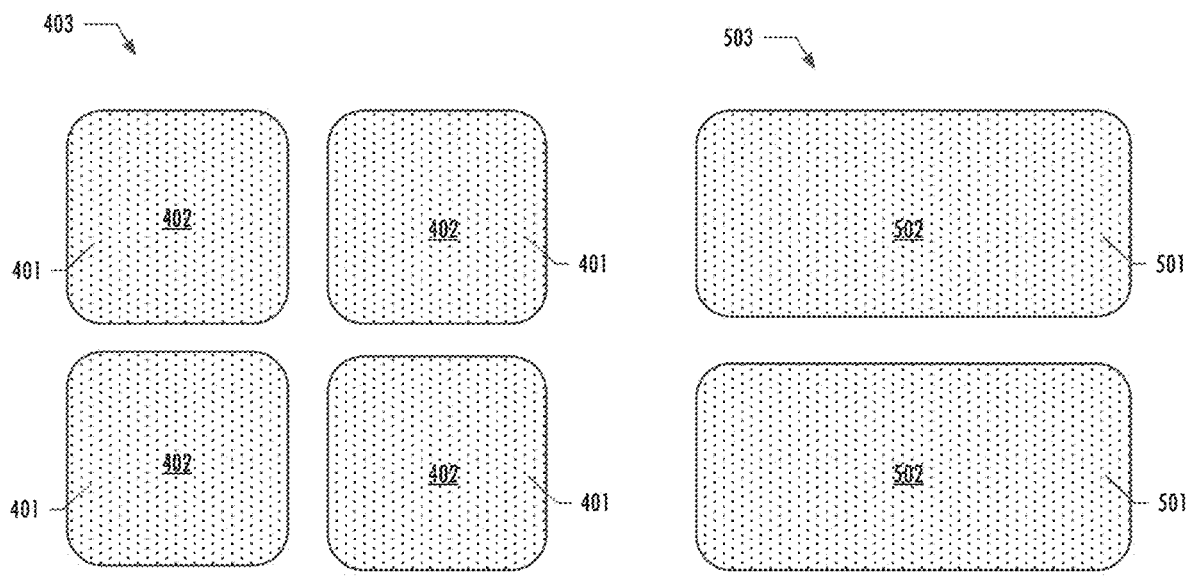
FIG. 4
FIG. 5
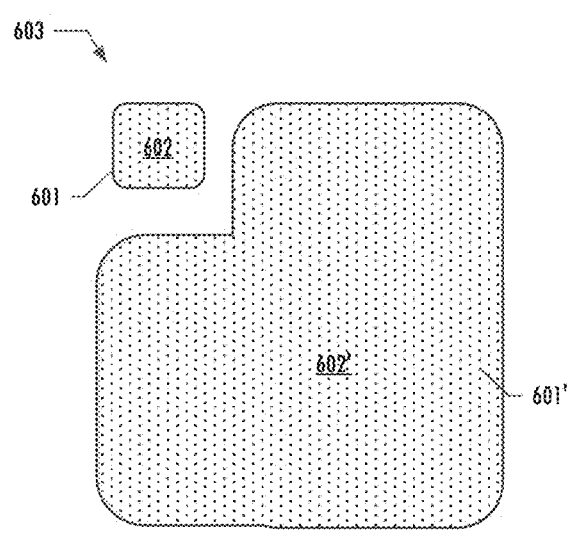
FIG. 6

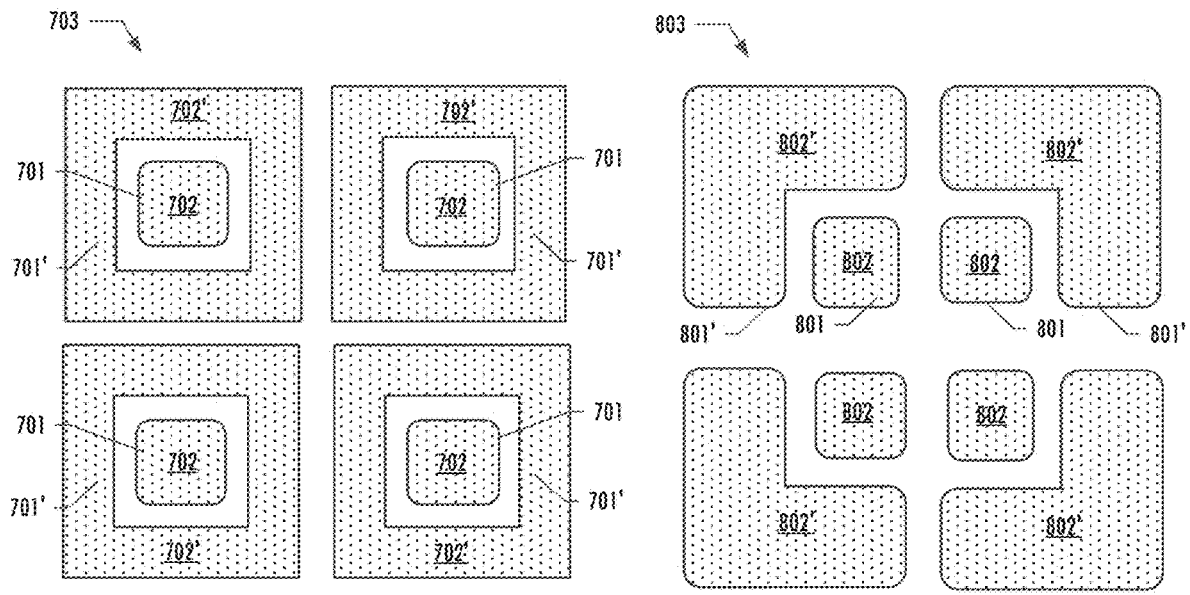
FIG. 7
FIG. 8
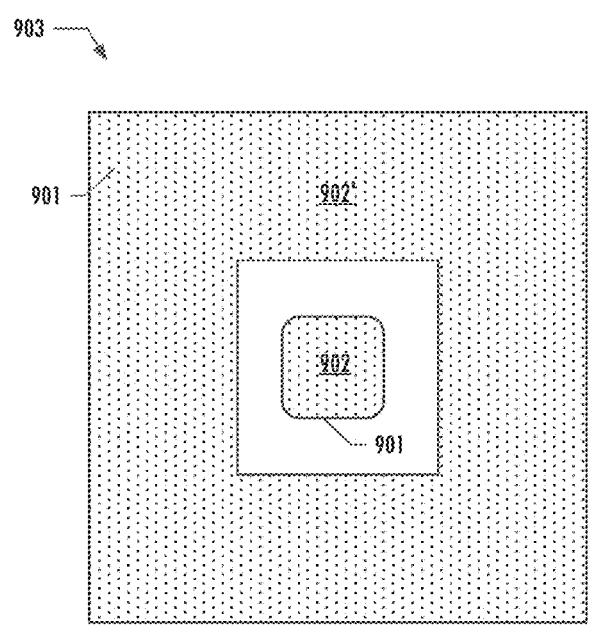
FIG. 9

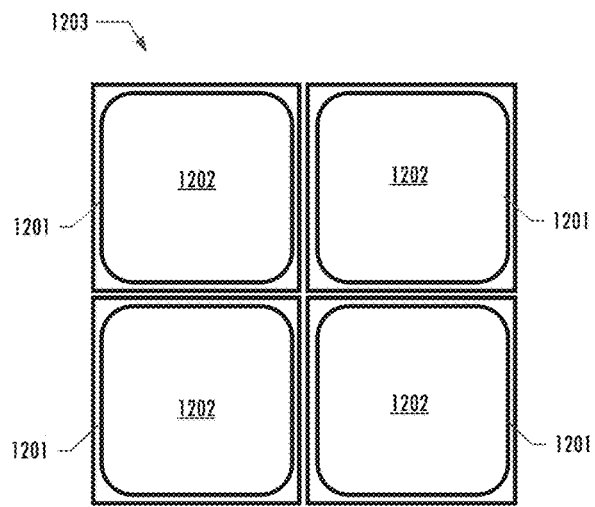 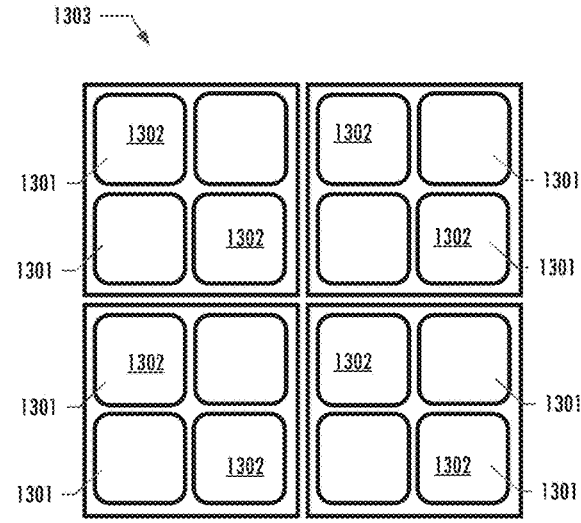
FIG. 12　　　　　FIG. 13
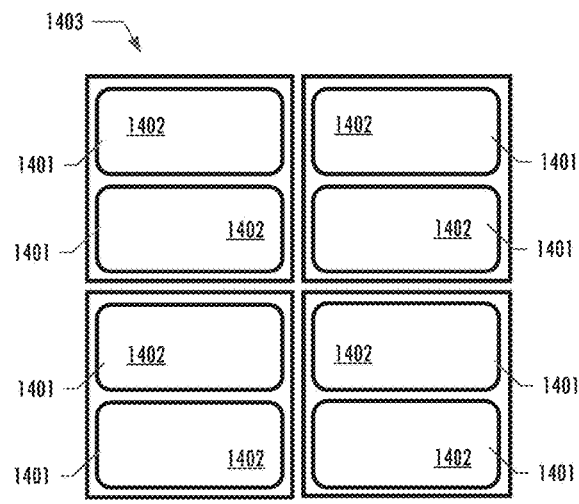 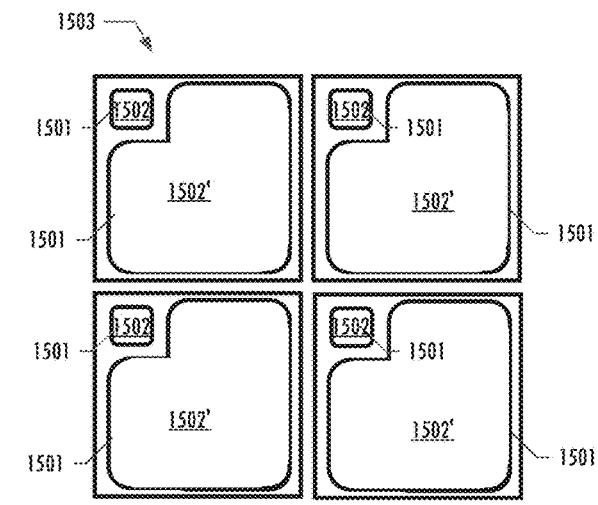
FIG. 14　　　　　FIG. 15

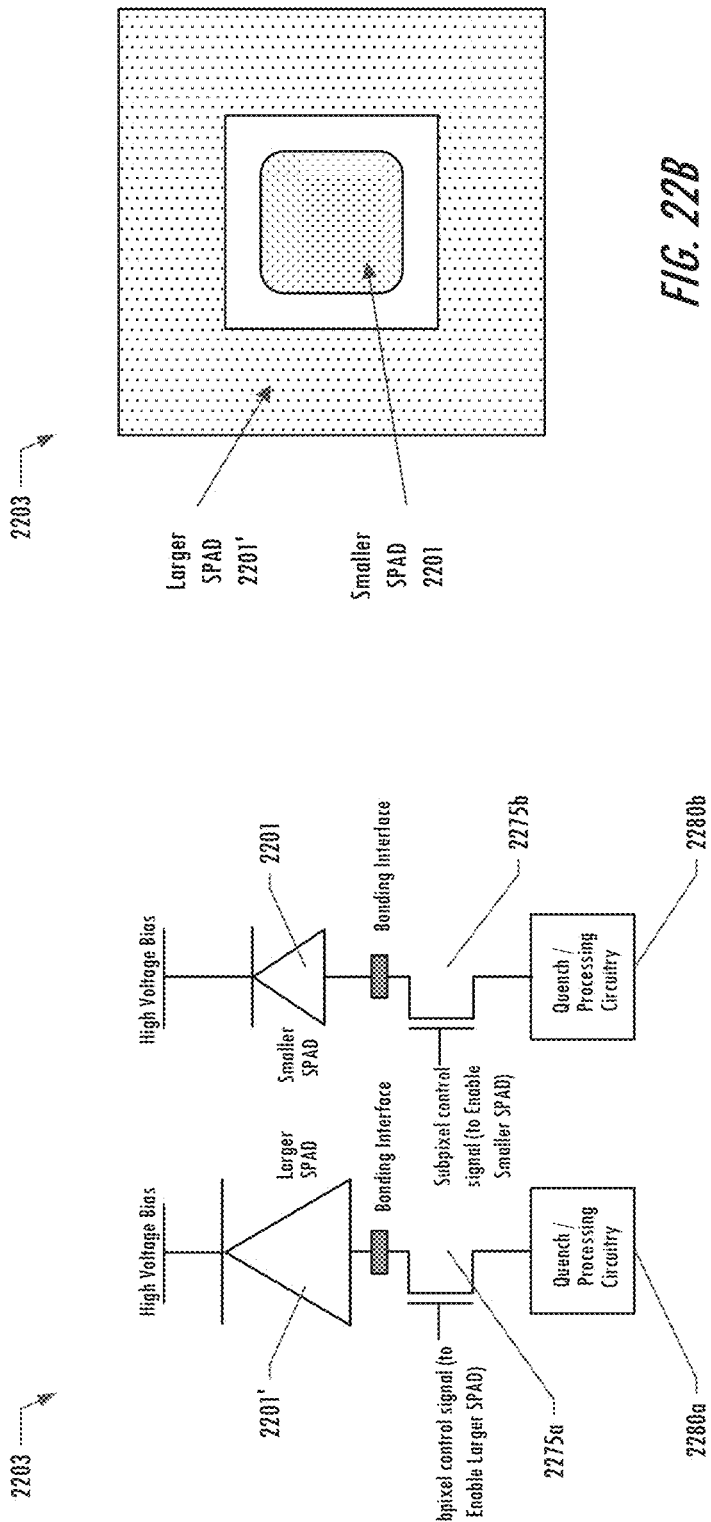

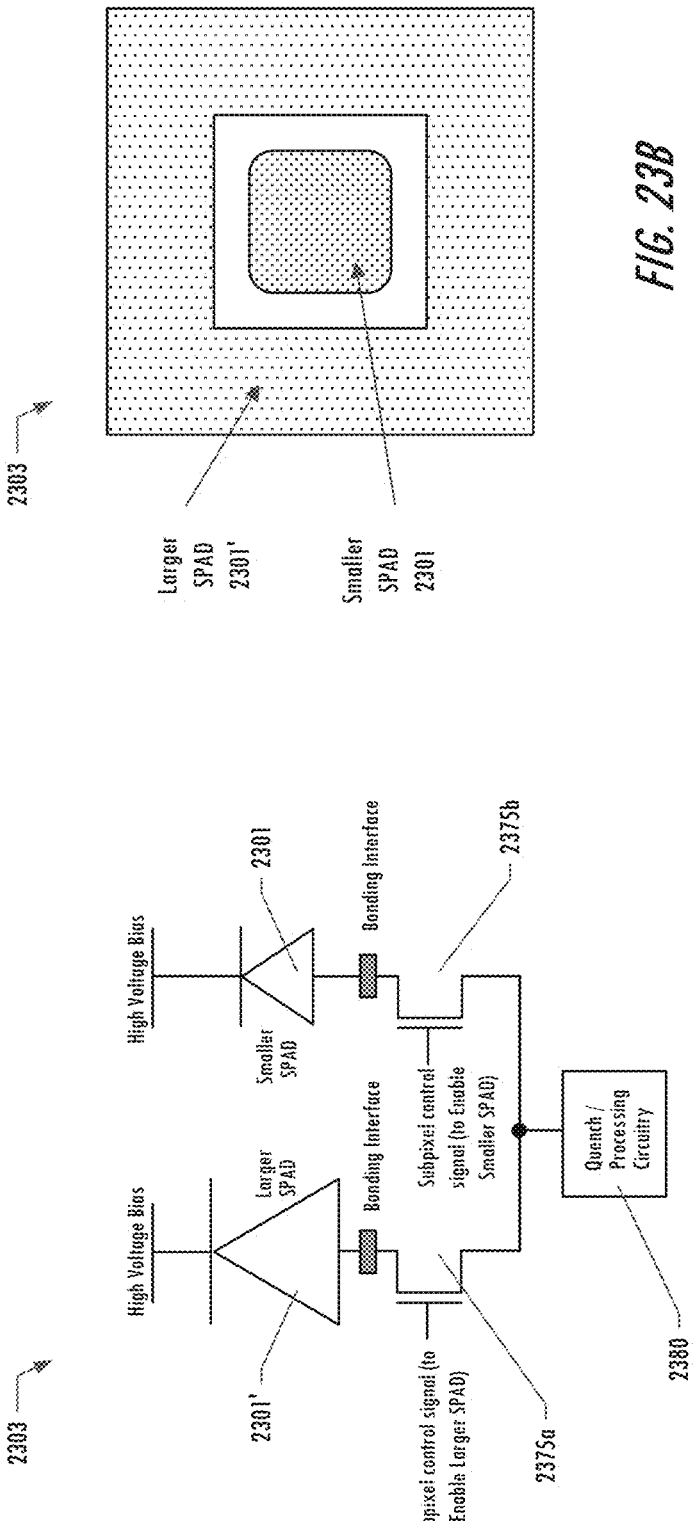

EXTENDED DYNAMIC RANGE AND REDUCED POWER IMAGING FOR LIDAR DETECTOR ARRAYS

CLAIM OF PRIORITY

This application claims the benefit of priority from U.S. Provisional Patent Application No. 62/814,452, filed Mar. 6, 2019, in the United States Patent and Trademark Office, the disclosure of which is incorporated by reference herein in its entirety.

FIELD

The present disclosure relates generally to imaging, and more specifically to Light Detection And Ranging (LIDAR)-based imaging.

BACKGROUND

Time of flight (ToF) based imaging is used in a number of applications including range finding, depth profiling, and 3D imaging (e.g., Light Detection And Ranging (LIDAR)). ToF 3D imaging systems can be categorized as indirect ToF or direct ToF systems. Direct ToF measurement includes directly measuring the length of time between emitting radiation by an emitter element of a LIDAR system, and sensing the radiation after reflection from an object or other target by a detector element of the LIDAR system. From this, the distance to the target can be determined. In specific applications, the sensing of the reflected radiation may be performed using a detector array of single-photon detectors, such as a Single Photon Avalanche Diode (SPAD) detector array. SPAD detector arrays may be used as solid-state detectors in imaging applications where high sensitivity and timing resolution are desired.

A SPAD is based on a p-n junction device biased beyond its breakdown region, for example, by or in response to a strobe signal having a desired pulse width. The high reverse bias voltage generates a sufficient magnitude of electric field such that a single charge carrier introduced into the depletion layer of the device can cause a self-sustaining avalanche via impact ionization. The avalanche is quenched by a quench circuit, either actively or passively, to allow the device to be "reset" to detect further photons. The initiating charge carrier can be photo-electrically generated by means of a single incident photon striking the high field region. It is this feature which gives rise to the name 'Single Photon Avalanche Diode'. This single photon detection mode of operation is often referred to as 'Geiger Mode'.

SUMMARY

Some embodiments described herein provide methods, systems, and devices including electronic circuits that provide a LIDAR system including one or more emitter elements (including one or more light emitting devices or lasers, such as surface- or edge-emitting laser diodes; generally referred to herein as emitters, which output optical signals in response to emitter control signals), one or more detector elements (including photodetectors, such as photodiodes, including avalanche photodiodes and single-photon avalanche detectors; generally referred to herein as detectors, which output detection signals in response to incident light), and/or one or more control circuits that are configured to selectively operate different subsets of the detector elements for respective image acquisition cycles.

In particular, embodiments of the present disclosure are directed to detector arrays including one or more detector pixels, where a respective detector pixel includes multiple detector elements (e.g., SPADs) for collecting optical information from a scene, also referred to herein as compound pixels. In some embodiments, power consumption of the detector array can be reduced by implementing more than one SPAD per pixel, selectively collecting the outputs of a determined or optimal number of SPADs to a processing circuit, and adjusting this determined or optimal number of SPADs that are active during image acquisition via a controller or control circuit on a per-pixel, per-region basis or in a global fashion or manner, thereby varying the active or effective detection area of one or more pixels of a multi-detector pixel of a detector array. The dynamic range of a pixel, region of the array, or up to the entirety of the array may be increased by dynamically adjusting the effective detection area of each pixel in response to the photon flux or intensity of incident light impinging on each pixel/region/array.

According to some embodiments of the present disclosure, a Light Detection And Ranging (LIDAR) system or detector circuit includes a plurality of detector pixels, where each or a respective detector pixel of the detector pixels includes a plurality of detector elements. At least one control circuit is configured to provide one or more detector control signals that selectively activate one or more of the detector elements of the respective detector pixel to define a first active detection area including a first subset of the detector elements for a first image acquisition, and a second active detection area including a second subset of the detector elements for a second image acquisition. The first and second image acquisitions may be associated with respective lighting conditions and/or distance ranges.

In some embodiments, the at least one control circuit is configured to provide the one or more detector control signals for the first and second image acquisitions responsive to first and second intensities of incident light, respectively.

In some embodiments, the at least one control circuit may be configured to determine the first and second intensities of the incident light based on an output of at least one of the detector elements or an ambient light sensor distinct therefrom.

In some embodiments, the first intensity may be greater than the second intensity, and the first active detection area may be less than the second active detection area.

In some embodiments, at least one of the detector elements of the first and/or second subsets may be polarization-selective, that is, configured to detect light of a particular polarization among a plurality of polarizations of the incident light. For example, the at least one of the detector elements may include a polarizer thereon. In some embodiments, the polarizer may include metallization that defines a grid pattern. In some embodiments, the metallization may be configured to provide electrical connection to one or more elements of the LIDAR detector circuit.

In some embodiments, the at least one control circuit is configured to provide the one or more detector control signals for the first and second image acquisitions based on first and second distance ranges corresponding thereto, respectively.

In some embodiments, the first distance range may include closer distances than the second distance range, and the first active detection area may be less than the second active detection area.

In some embodiments, the first and second image acquisitions may be respective subframes of an image frame. For example, the first and second image acquisitions may be first and second detection windows or strobe windows corresponding to the first and second distance ranges.

In some embodiments, the one or more detector control signals may include strobe signals and/or subpixel control signals. The strobe signals may be configured to activate the detector pixels to detect photons incident thereon for the respective subframes. The subpixel control signals may be configured to connect respective outputs of the one or more of the detector elements of the respective detector pixel to the at least one control circuit.

In some embodiments, the at least one control circuit may be configured to provide the one or more detector control signals to activate at least one of the detector elements of the first and/or second subsets independent of the first and second image acquisitions.

In some embodiments, the first and second subsets may include different quantities of the detector elements, and/or may include ones of the detector elements having different surface areas.

In some embodiments, multiple of the detector pixels may include a respective plurality of detector elements, and the at least one control circuit may be configured to provide the one or more detector control signals to the multiple of the detector pixels for the first and second image acquisitions.

According to some embodiments of the present disclosure, a method of operating a Light Detection And Ranging (LIDAR) detector circuit includes performing operations by at least one processor that is coupled to a plurality of detector pixels. The operations include providing one or more detector control signals that selectively activate one or more detector elements of a respective detector pixel of the detector pixels to define a first active detection area including a first subset of the detector elements for a first image acquisition, and a second active detection area including a second subset of the detector elements for a second image acquisition.

According to some embodiments of the present disclosure, a light detection and ranging (LIDAR) system or detector circuit may include a plurality of detector pixels, where each or a respective detector pixel of the detector pixels includes a plurality of detector elements. At least one control circuit is configured to dynamically adjust a sensitivity and/or power consumption of the respective detector pixel for respective image acquisitions based on incident light conditions and/or distance ranges associated with the respective image acquisitions.

In some embodiments, the at least one control circuit may be configured to dynamically adjust the sensitivity and/or power consumption of the respective detector pixel by selectively activating different subsets of the detector elements to vary an active detection area of the respective detector pixel to for the respective image acquisitions.

In some embodiments, the different subsets may include different quantities of the detector elements, and/or may include ones of the detector elements having different surface areas.

In some embodiments, the detector elements may include at least one polarization-selective detector element. The at least one control circuit may be configured to dynamically adjust the sensitivity and/or power consumption of the respective detector pixel by selectively activating the at least one polarization-selective detector element for the respective image acquisitions based on the light conditions associated therewith.

In some embodiments, the at least one polarization-selective detector element may include a polarizer thereon. The polarizer may include metallization defining a grid pattern, and/or may be configured to provide electrical connection to elements of the LIDAR detector circuit.

In some embodiments, the at least one control circuit may be configured to activate at least one of the detector elements of the respective pixel independent of the incident light conditions and/or distance ranges associated with the respective image acquisitions.

According to some embodiments of the present disclosure, a method of operating a Light Detection And Ranging (LIDAR) detector circuit includes performing operations by at least one processor that is coupled to an array of detector pixels. The operations include dynamically adjusting a sensitivity and/or power consumption of the respective detector pixel of the array of detector pixels for respective image acquisitions based on incident light conditions and/or distance ranges associated with the respective image acquisitions, where the respective detector pixel includes a plurality of detector elements.

According to some embodiments of the present disclosure, a Light Detection And Ranging (LIDAR) detector array includes a plurality of detector pixels, where each or a respective detector pixel of the detector pixels includes a plurality of detector elements. At least one control circuit is configured to dynamically adjust an active detection area of the respective detector pixel by selectively activating first and second subsets of the detector elements for first and second image acquisitions, respectively.

In some embodiments, the LIDAR detector circuit or system may be configured to be coupled to an autonomous vehicle and oriented relative to an intended direction of travel of the autonomous vehicle.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

BRIEF DESCRIPTION OF THE DRAWINGS

FIGS. 2A and 3A illustrate example detector arrays with compound detector pixels including multiple detectors per detector pixel in accordance with some embodiments of the present disclosure.

FIGS. 2B and 3B are circuit diagrams illustrating example compound detector pixels of FIGS. 2A and 3A, respectively, in accordance with some embodiments of the present disclosure.

FIGS. 4-9 are plan views illustrating examples of compound detector pixels including multiple detectors per pixel in accordance with some embodiments of the present disclosure.

FIGS. 12-20 are plan views illustrating examples of various compound detector pixels including multiple detector elements per pixel in accordance with some embodiments of the present disclosure.

FIGS. 22A and 22B illustrate a circuit diagram and a plan view, respectively, of an example implementation of a stacked compound detector pixel including two concentric SPADs that operate separately in accordance with some embodiments of the present disclosure.

FIGS. 23A and 23B illustrate a circuit diagram and a plan view, respectively, of an example implementation of a stacked compound detector pixel including two concentric SPADs that operate in combination in accordance with some embodiments of the present disclosure.

DETAILED DESCRIPTION OF EMBODIMENTS

In the following detailed description, numerous specific details are set forth to provide a thorough understanding of embodiments of the present disclosure. However, it will be understood by those skilled in the art that the present disclosure may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Embodiments of the present disclosure are described herein with reference to lidar applications and systems. A lidar system may include an array of emitters and an array of detectors, or a system having a single emitter and an array of detectors, or a system having an array of emitters and a single detector. As described herein, one or more emitters may define an emitter unit, and one or more detectors may define a detector pixel. A flash lidar system may acquire images by emitting light from an array, or a subset of the array, of emitter elements for short durations (pulses) over a field of view (FOV) or scene. A non-flash or scanning lidar system may generate image frames by raster scanning light emission (continuously) over a field of view or scene, for example, using a point scan or line scan to emit the necessary power per point and sequentially scan to reconstruct the full field of view FOV.

Figure 1A:
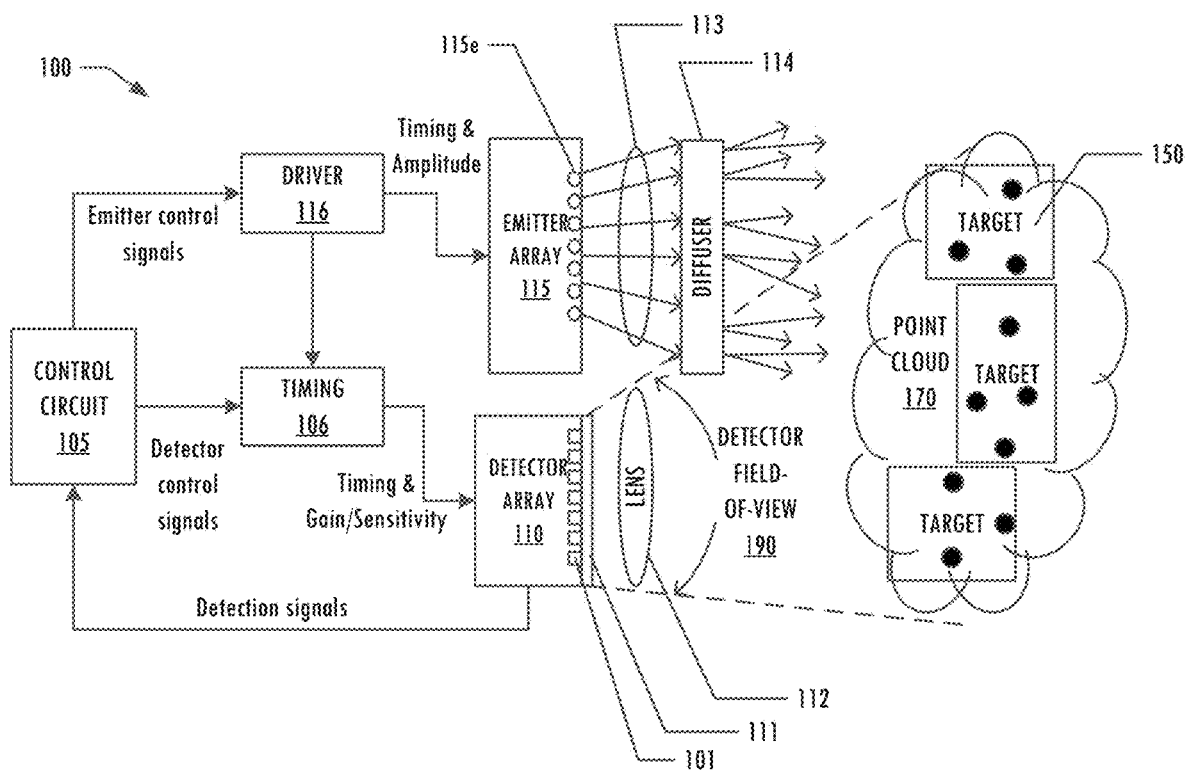
FIG. 1A is a block diagram illustrating an example lidar system or circuit in accordance with some embodiments of the present disclosure.

An example of a ToF measurement system or circuit 100 in a LIDAR application that may operate in accordance with embodiments of the present disclosure is shown in FIG. 1A. The lidar system or circuit 100 includes a control circuit 105, a timing circuit 106, an emitter array 115 including a plurality of emitters 115e, and a detector array 110 including a plurality of detectors 101. The detectors 101 include time-of-flight sensors (for example, an array of single-photon detectors, such as SPADs). One or more of the emitter elements 115e of the emitter array 115 may define emitter units that respectively emit optical illumination pulses or continuous wave signals (generally referred to herein as optical signals or emitter signals) at a time and frequency controlled by a timing generator or driver circuit 116. In particular embodiments, the emitters 115e may be pulsed light sources, such as LEDs or lasers (such as vertical cavity surface emitting lasers (VCSELs)). The optical signals are reflected back from a target 150, and sensed by detector pixels defined by one or more detector elements 101 of the detector array 110. The control circuit 105 may implement a pixel processor that measures and/or calculates the time of flight of the illumination pulse over the journey from emitter array 115 to target 150 and back to the detectors 101 of the detector array 110, using direct or indirect ToF measurement techniques.

In some embodiments, an emitter module or circuit 115 may include an array of emitter elements 115e (e.g., VCSELs), a corresponding array of optical elements 113,114 coupled to one or more of the emitter elements (e.g., lens(es) 113 (such as microlenses) and/or diffusers 114), and/or driver electronics 116. The optical elements 113, 114 may be optional, and can be configured to provide a sufficiently low beam divergence of the light output from the emitter elements 115e so as to ensure that fields of illumination of either individual or groups of emitter elements 115e do not significantly overlap, and yet provide a sufficiently large beam divergence of the light output from the emitter elements 115e to provide eye safety to observers.

The driver electronics 116 may each correspond to one or more emitter elements, and may each be operated responsive to timing control signals with reference to a master clock and/or power control signals that control the peak power of the light output by the emitter elements 115e, for example, by controlling the peak drive current to the emitter elements 115e. In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors configured to control the modulation frequency, timing and amplitude/power level of the optical signals that are output from the emitters 115e.

In some embodiments, a receiver/detector module or circuit 110 includes an array of detector pixels (with each detector pixel including one or more detectors 101, e.g., SPADs), receiver optics 112 (e.g., one or more lenses to collect light over the FOV 190), and receiver electronics (including timing circuit 106) that are configured to power, enable, and disable all or parts of the detector array 110 and to provide timing signals thereto. The detector pixels can be activated or deactivated with at least nanosecond precision, and may be individually addressable, addressable by group, and/or globally addressable. The receiver optics 112 may include a macro lens that is configured to collect light from the largest FOV that can be imaged by the lidar system, microlenses to improve the collection efficiency of the detecting pixels, and/or anti-reflective coating to reduce or prevent detection of stray light. In some embodiments, a spectral filter 111 may be provided to pass or allow passage of 'signal' light (i.e., light of wavelengths corresponding to those of the optical signals output from the emitters) but substantially reject or prevent passage of non-signal light (i.e., light of wavelengths different than the optical signals output from the emitters).

The detectors 101 of the detector array 110 are connected to the timing circuit 106. The timing circuit 106 may be phase-locked to the driver circuitry 116 of the emitter array 115. The sensitivity of each of the detectors 101 or of groups of detectors may be controlled. For example, when the detector elements include reverse-biased photodiodes, avalanche photodiodes (APD), PIN diodes, and/or Geiger-mode Avalanche Diodes (SPADs), the reverse bias may be adjusted, whereby, the higher the overbias, the higher the sensitivity. When the detector elements 101 include integrating devices such as a CCD, CMOS photogate, and/or photon mixing device (pmd), the charge integration time may be adjusted such that a longer integration time translates to higher sensitivity.

Light emission output from one or more of the emitters 115e impinges on and is reflected by one or more targets 150, and the reflected light is detected as an optical signal (also referred to herein as a return signal, echo signal, or echo) by one or more of the detectors 101 (e.g., via receiver optics 112), converted into an electrical signal representation (referred to herein as a detection signal), and processed (e.g., based on time of flight) to define a 3-D point cloud representation 170 of the field of view 190. Operations of lidar systems in accordance with embodiments of the present disclosure as described herein may be performed by one or more processors or controllers, such as the control circuit 105 of FIG. 1A.

Figure 1B:
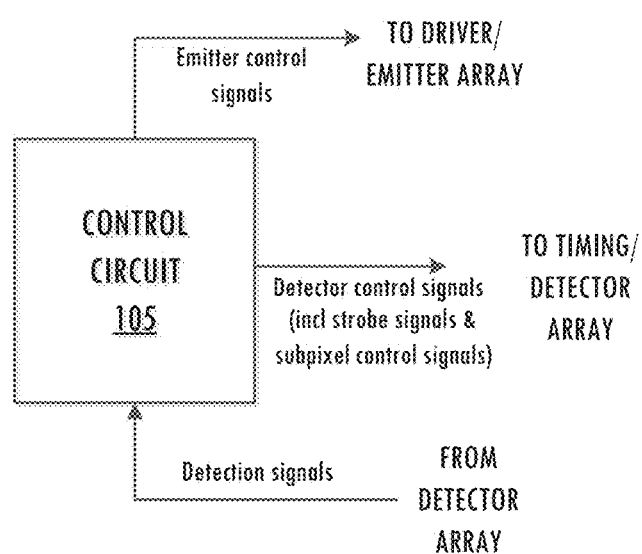
FIG. 1B is a block diagram illustrating the control circuit of FIG. 1A in greater detail in accordance with some embodiments of the present disclosure.

FIG. 1B illustrates the control circuit 105 in greater detail. The control circuit 105 may include one or more control circuits, for example, an emitter control circuit (also referred to as an emitter circuit) that is configured to provide the emitter control signals via the driver circuitry 116 of the emitter array 115, and/or a detector control circuit (also referred to as a detector circuit) that is configured to provide the detector control signals via the timing circuitry 106 of the detector array 110 as described herein. 'Strobing' as used herein may refer to the generation of control signals (also referred to herein as strobe signals or 'strobes') that control the timing and/or duration of activation (detection windows or strobe windows) of one or more detector pixels of the system 100. For example, the detector control signals output from the control circuit 105 may be provided to a variable delay line of the timing circuitry 106, which may generate and output the strobe signals with the appropriate timing delays to the detector array 110. The control circuit 105 is also configured to provide or control the generation of additional detector control signals (also referred to herein as subpixel control signals) that selectively activate individual detectors 101 in a pixel, to control the number of active detectors 101 within the pixel. The control circuit 105 may also include processing circuit that receives and processes the detection signals output from the detector array 110 to calculate the time of flight of an illumination pulse based thereon, and/or a sequencer circuit that is configured to coordinate operation of the emitters 115e and detectors 101. More generally, the control circuit 105 may include one or more circuits that are configured to coordinate the timing and durations of operation of the emitters 115e and/or the detectors 101 (at the pixel level and/or at the individual detector level), e.g., for the respective strobe windows between the pulses of the optical signals from the emitters 115e, and/or to process the detection signals output from the detectors 101 in response.

As noted above, a detection window or strobe window may refer to the respective durations of activation and deactivation of one or more detector pixels (e.g., responsive to respective strobe signals from a control circuit) over the temporal period or time between pulses of the emitter(s) (which may likewise be responsive to respective emitter control signals from a control circuit). The time between pulses (which defines a laser cycle, or more generally emitter pulse frequency) may be selected or may otherwise correspond to a desired imaging distance range for the LIDAR system. The distance range may be shorter or equal to the distance traversed by light during the time between pulses of the optical signals. Each strobe window may be differently delayed relative to the emitter pulses, and thus may correspond to a respective portion or subrange of the distance range. Each strobe window may also correspond to a respective image acquisition subframe (or more particularly, point cloud acquisition subframe, generally referred to herein as a subframe) of an image frame. That is, each image frame includes a plurality of subframes, each of the subframes samples or collects data (e.g., as an accumulation of photons) for a respective strobe window over the temporal period, and each strobe window covers or corresponds to a respective distance subrange of the distance range. A subframe may be read out before moving the strobe window to a new distance range. Range measurements and strobe window subrange correspondence as described herein are based on time of flight of an emitted pulse.

The dynamic range of a detector pixel (e.g., a SPAD pixel) of a detector array 110 may be determined by the ratio of its saturation level and its noise floor. While primarily described with reference to detector arrays including SPAD pixels by way of example, it will be understood that detector arrays as described herein are not limited to any particular photodetector type, and may use other types of photodetectors (e.g., avalanche photodiodes (APD), PIN diodes, etc.) in accordance with embodiments of the present disclosure. The photon flux saturation level of a SPAD pixel may be determined by the photon detection probability of the SPAD pixel, and by the maximum rate of avalanches which the SPAD pixel can support or detect. For a given SPAD technology and overbias, with optics (e.g., receiver optics 112) that focus incident photons across up to an entirety of the pixel area, a detection probability can be determined by the fill factor of the pixel, i.e., the percentage of the pixel area which contains the active detection region or area. The avalanche rate supported by a SPAD pixel may be determined by the dead time of the pixel (i.e., the duration of time for which a SPAD cannot detect incident photons after an initial avalanche event has occurred; also referred to as reset/recharge time) as well as the afterpulsing statistics of the pixel (e.g., the likelihood of triggering a new avalanche due to the release of a trapped charge carrier from a subsequent avalanche event rather than a new incident photon). If the mean photon arrival rate is comparable to the dead time, the SPAD may not have enough time to recharge such that some incident photons may not be detected. If the afterpulsing probability is too high, a significant percentage of avalanches may be a result of afterpulsing, rather than of photon detection, such that the detected avalanches may not accurately indicate the incident photons.

Both dead time and afterpulsing probabilities may increase as the area of a SPAD pixel increases. Dead time can depend on the capacitance to be recharged. Afterpulsing can depend on the total charge flowing during an avalanche, which in turn can depend on the capacitance (and thus the surface area) of the SPAD pixel.

Power consumption may also be problematic in arrays with a relatively large number of detector elements (e.g., SPADs). The power required to charge a SPAD may be a function of the overbias of the SPAD and its capacitance. Thus, larger surface area SPADs can require higher operating power than smaller surface area SPADs, even if the SPADs are based on the same technology and overbias. At higher optical fluxes, power consumption of entire arrays can be very high (e.g., 2.54 W in "A 30-frames/s, 252×144 SPAD Flash LiDAR With 1728 Dual-Clock 48.8-ps TDCs, and Pixel-Wise Integrated Histogramming" Zhang et al., IEEE Journal of Solid-State Circuits 2018).

In some LIDAR detector applications, ambient conditions may vary from dark (no ambient light or low intensity of ambient light) to very bright (high intensity of ambient light). At very bright conditions, the detectors may be blinded. For example, for a SPAD-based detector array, the photon flux may be so high that the SPADs cannot recharge and thus cannot detect signal photons. As such, some conventional SPAD-based detector arrays may specify or limit operation to a maximum ambient light of only about 50 kilo lux (klux), whereas it may be desirable to operate at greater levels or intensities of ambient light (e.g., at 100 klux or more).

Some SPAD-based detector arrays may use multiple SPADs per pixel in order to reduce background or ambient light detection (also referred to herein as background), for example, using temporal correlations to preferentially select signal photons over non-correlated background photons. However, such operation may greatly reduce the probability of detecting signal photons, because in order to register a correlated detection, multiple coincident photon detections may be required. Such detector arrays may also suffer from cross-talk between the multiple SPADs in a pixel, which by definition are correlated.

Some embodiments described herein are directed to detector pixels and arrays thereof whereby a respective detector pixel includes more than one detector 101 (e.g., more than one SPAD), which as noted above may be referred to as compound detector pixels. A region of the field of view 190 is mapped (e.g., uniformly) to the pixel area or to the active areas of the pixel. In particular, the angle subtended by a smallest object detectable by the detector array 110 or system 100 may be mapped onto a respective compound pixel. For example, if the receiver lens 112 is an F-theta lens, the pitch of the detector pixels in the detector array 110 may correspond to the focal length of the receiver lens 112 times the angle subtended by the smallest object. As such, the object may be imaged by all detectors 101 of a respective detector pixel. A control unit or circuit, such as the control circuit 105, determines or controls which and/or how many detectors 101 in a respective pixel are active for a given acquisition cycle (e.g., a respective point cloud acquisition subframe of an image frame), for example, by providing strobe signals and subpixel control signals that activate respective pixels and subsets (e.g., different subsets) of the detectors 101 in each pixel to provide respective outputs to one or more processing circuits. For example, the control circuit 105 may be configured to progressively activate more detectors 101 per pixel during acquisition cycles indicating less-reflective targets and/or corresponding to long-range strobe windows (corresponding to farther distance ranges relative to the detectors) to improve signal detection by the detectors 101 for dimmer targets and/or at longer ranges. Conversely, the control circuit 105 may be configured to activate fewer detectors 101 per pixel during acquisition cycles indicating more-reflective targets and/or corresponding to short-range strobe windows (corresponding to closer distance ranges relative to the detectors). That is, in contrast to some silicon photomultiplier arrays (SiPM) that may include multiple (or clusters of) diodes in a pixel (such as described in U.S. Pat. No. 8,476,571), embodiments of the present disclosure can selectively activate subsets of the diodes or detectors in a pixel based on external conditions and in an addressable manner.

In some embodiments, the direct or buffered output detection signals from each detector 101 (e.g., SPAD) can be connected to a common processing circuit, e.g., through one or more switches (implemented by PMOS transistors in FIGS. 2B and 3B by way of example). The detectors 101 may define subpixel elements of a detector pixel, and may be controlled by respective subpixel control signal(s), which may be (directly or indirectly) provided by the control circuit 105. The control circuit 105 may also (directly or indirectly) provide respective strobe signals that activate and deactivate subsets of the detector pixels at predetermined times and for predetermined durations to define the respective strobe windows of detector operation. That is, there may be two aspects to activating detector elements 101 in some embodiments, (i) activating or enabling respective detector pixels (each of which includes more than one detector element 101) within a strobe window responsive to respective strobe signals to ensure that the respective detector pixels observe the scene (or corresponding portions thereof), and (ii) activating a subset of the detector elements 101 in a detector pixel responsive to respective subpixel control signals to control the number of active detector elements 101 for the strobe window of activation of that detector pixel. Detector control signals may be used herein to refer to strobe signals and/or subpixel control signals. As such, each of the multiple detector elements in a pixel may be individually addressable, and may be activated as a function of both a strobe signal (to enable the pixel) and a respective subpixel control signal (to enable that particular detector element among the multiple detector elements of the pixel). The control circuit 105 may be on-chip (e.g., in a stacked arrangement with the pixels of the detector array) or off-chip in some embodiments.

In some embodiments, the control circuit 105 may be configured to provide the detector control signals responsive to detected ambient photons (e.g., based on detection signals output from pixel(s) of the detector array 110 and/or from a dedicated ambient light sensor). In a particular example, detection of ambient light to identify the activity rate (e.g., the level of photon activity) in the scene and adjusting the number of enabled detectors 101 accordingly can be achieved by either acquiring a frame or subframe from detection signals output from the detector array 110, or by operation of another sensor such as an ambient light sensor (ALS). In some embodiments, it may be preferable to acquire a frame or subframe from the detector array 110, in that the activity rate seen by each pixel is known (e.g., can be verified by outputs from one or more other pixels), while an ALS may provide a more global indication that may or may not match the outputs from pixels in the detector array 110. If the control circuit 105 determines that photon flux is high (i.e., based on detection of a high level or intensity of ambient light), then a smaller subset of detectors 101 in a pixel may be activated (e.g., only one SPAD of the pixel may be active, that is, recharged and its output connected to the processing circuit). If the control circuit 105 determines that the photon flux is low (i.e., based on detection of a low level or intensity of ambient light), then a greater subset of the detectors 101 in a pixel is activated (e.g., all SPADs of the pixel are activated, that is, recharged and their respective outputs connected to the processing circuit). If the control circuit 105 determines that the photon flux is intermediate (i.e., based on detection of an intermediate level or intensity of ambient light), then more than one but less than all of the detectors 101 in a pixel are activated (e.g., more than one but less than all of the SPADs of the pixel).

The control circuit 105 may be configured to perform the detection of ambient light intensity, the determination as to which detector(s) 101 of which pixels of the detector array 110 are to be activated, and the selective activation of the detector(s) 101 of the pixels as often as desired (e.g., in response to changing ambient light conditions), described herein with reference to respective image acquisitions or acquisition cycles for purpose of illustration rather than limitation. Likewise, although described herein with reference to selective activation of detector elements 101 of a single pixel to provide varying active detection areas, it will be understood that the control circuit 105 may be configured to similarly or differently control the detector elements 101 of other pixels of the detector array 110 for respective image acquisitions or acquisition cycles, e.g., such that pixels in one region of the detector array 110 provide a larger active detection area while pixels in another region of the detector array 110 provide a smaller active detection area (e.g., in response to differing ambient light conditions at or imaged by the different regions of the detector array 110).

FIGS. 2A and 3A illustrate example detector arrays and circuits 210 and 310 including multiple detectors 101 per detector pixel in accordance with some embodiments of the present disclosure. FIGS. 2B and 3B illustrate example individual compound detector pixels and circuits 203 and 303 of FIGS. 2A and 3A, respectively. The examples of FIGS. 2A, 2B, 3A, and 3B are described with reference to SPAD implementations of the detectors 101 of each compound detector pixel 203, 303, but other types of photodetectors may also be used in accordance with embodiments described herein.

As shown in FIGS. 2A, 2B, 3A, and 3B, four SPADs 101 define each compound detector pixel 203, 303, with four pixels 203, 303 per array 210, 310. In some embodiments as shown in FIGS. 2A and 2B, the SPADs 101 of each pixel 203 are sized identically, that is, with each SPAD 101 having the same active surface area 202. In some embodiments as shown in FIGS. 3A and 3B, each of the multiple SPADs 101 per pixel 303 is sized differently, for example, with each SPAD 101 having a different active surface area 302, 302', 302'', and 302'''. Such a configuration of detector elements 101 with different active surface areas 302, 302', 302'', and 302''' in the same pixel 303 can provide additional control of detection probability and power consumption when subsets of the SPADs 101 of the pixel 303 are activated. As shown in FIGS. 2B and 3B, the active detection area of each compound detector pixel 203 and 303 can be varied (e.g., in response to changing ambient light conditions) responsive to respective subpixel control signals. In the examples of FIGS. 2B and 3B, the subpixel control signals are provided to respective gates of transistors 175, which couple the outputs of each of the detectors 101 to a processing circuit (such as the control circuit 105).

Table 1 below provides an example of a compound detector pixel that contains four detectors, each sized differently (e.g., each SPAD in a pixel having a different active surface area, as shown in FIGS. 3A and 3B). However, it will be understood that embodiments described herein are not limited to four detectors per detector pixel, and compound or multi-detector pixels as described herein may each include any number of photodetectors with respective (same or different) active surface areas. Moreover, the number of detectors per pixel need not be identical among the pixels of the detector array.

Referring to Table 1, one or more detector pixels of a detector array may include four SPADs, SPAD #1-4. SPAD #1 has an active surface area of 1 square micron, and SPAD #2, #3, and #4 have active surface areas of 2, 3 and 5 square microns, respectively. The control circuit is configured to select a respective setting (illustrated as Settings 1-11) for one or more pixels (e.g., where each setting includes activation of a different subset of the SPADs SPAD #1-4, and thus, defines a different active detection area per pixel), for example, based on the detected light flux. That is, the control circuit provides respective subpixel control signals to selectively activate one or more of the detectors (SPAD #1-4) of a respective compound detector pixel to define different active detection areas for one or more pixels for respective image acquisitions or acquisition cycles.

TABLE 1

| Setting | SPAD#1 | SPAD#2 | SPAD#3 | SPAD#4 | Total Active Detection Area |
|---|---|---|---|---|---|
| 1 | 1 | 0 | 0 | 0 | 1 |
| 2 | 0 | 1 | 0 | 0 | 2 |
| 3 | 1 | 1 | 0 | 0 | 3 |
| 4 | 1 | 0 | 1 | 0 | 4 |
| 5 | 0 | 1 | 1 | 0 | 5 |
| 6 | 1 | 1 | 1 | 0 | 6 |
| 7 | 0 | 1 | 0 | 1 | 7 |
| 8 | 1 | 1 | 0 | 1 | 8 |
| 9 | 1 | 0 | 1 | 1 | 9 |
| 10 | 0 | 1 | 1 | 1 | 10 |
| 11 | 1 | 1 | 1 | 1 | 11 |

In some embodiments, the control circuit may be configured to continuously vary the number of active detectors in a compound detector pixel responsive to changing ambient light conditions in providing the different active detection areas for respective acquisition cycles. The active detection area for a pixel may thus be a sum of the respective active surface areas of the detector elements that are enabled for a particular acquisition cycle. In the example of FIGS. 2A and 2B, the maximum or total available active detection area per pixel 203 may be the sum of the four active surface areas 202. In the example of FIGS. 3A and 3B, the maximum or total available active detection area per pixel 303 may be the sum of the active surface areas 302, 302', 302'', and 302'''.

In the example shown in Table 1 above, the total available active detection area in a detector pixel is 1+2+3+5=11 square microns. However, at higher photon flux conditions, a fewer number of SPADs per pixel (e.g., only SPAD #1, with 1 square micron of active area) can be activated (connected to the processing circuitry and charged). The dead time of SPAD #1 is approximately 20% of SPAD #4 in this example, and is approximately 10% of a monolithic SPAD (i.e., a single SPAD per pixel) with the same total active area of the four SPADs. Thus, a much higher photon flux can be detected. Furthermore, the capacitance of SPAD #1 in this example is only about 10% of that of the four SPADs combined, and therefore the power consumption per avalanche may be reduced by a factor of 10 compared with a monolithic SPAD having a similar total active detection area (e.g., 11 square microns). At lower photon flux conditions, a greater number of SPADs per pixel (e.g., all four SPADs #1-4, with 11 square microns of active area), can be activated, and thus the sensitivity and power consumption may be comparable or approximately equivalent to that of a monolithic SPAD having a similar surface area. That is, by implementing multiple, individually controllable detector elements per pixel, embodiments described herein can provide comparable sensitivity but reduced power consumption relative to a monolithic detector element having a similar surface area per pixel.

Further non-limiting examples of detector arrays including multiple detectors per pixel are shown in FIGS. 4-9. In particular, FIG. 4 illustrates a quad implementation including four detector elements 401 in one pixel 403, with each of the four detector elements 401 having a same size and active surface area 402. FIG. 5 illustrates a pair implementation including two detector elements 501 in one pixel 503, with each of the two detector elements 501 having a same size and active surface area 502. FIG. 6 illustrates a ratio-ed pair implementation including two detector elements 601, 601' in one pixel 603, with each of the two detector elements 601, 601' having different sizes and active surface areas 602 and 602'.

FIGS. 7-9 illustrate embodiments configured such that a portion (e.g. a center point) of the compound detector pixel sampling of the light field (e.g., by centrally located detector elements of the pixel) may be invariant as to when other detector elements are enabled or disabled, to provide pixel sensitivity adjustment. For example, activating a centrally-located detector element of a compound detector pixel regardless of the activation states of the other detector(s) in the pixel (also referred to herein as centered sampling) can be used to maintain the modulation transfer function (MTF) of the spatial sampling centers. Such a pixel control scheme may also be invariant if pixel electronics are rotated or otherwise asymmetrical (e.g., for layout efficiency reasons). In particular, FIGS. 7 and 8 illustrate ratio-ed quad implementations including four detector elements 701', 801' with larger active surface areas 702', 802' in one pixel 703, 803, and four detector elements 701, 801 with smaller active surface areas 702, 802 to provide centered sampling. FIG. 9 illustrates a ratio-ed pair implementation including two detector elements 901, 901' with different sizes and active surface areas 902, 902' in one pixel 903, with the smaller detector element 901 providing centered sampling.

Further embodiments described herein may provide compound detector pixels (in accordance with any of the embodiments described above with reference to FIGS. 2-9) that include one or more polarization-selective detector elements, which may be configured to selectively detect light having one or more desired polarizations. For example, polarization selectivity may be implemented in some embodiments described herein by providing a polarizer, such as a polarization grid, on one or more of the detector elements in a detector pixel.

Polarization grids in accordance with some embodiments can be manufactured in CMOS by providing a metallization in the shape of or defining a grid pattern over the detector elements (described herein with reference to both BSI (backside illuminated) and FSI (frontside illuminated) embodiments). Sunlight has a high polarization, so although such grid patterns may attenuate the desired signal, signal to background ratio may also be improved, particularly from reflective surfaces receiving sunlight. Wire grid polarizers may be used in the near infrared (NIR) wavelength ranges with standard copper (Cu) metals.

As such, control circuits described herein may be configured to selectively enable or switch to a polarization-selective subset of the detector elements (e.g., one or more detector elements that include a polarization grid thereon) in a pixel if a standard subframe (e.g., as detected by one or more non-polarization-selective detector elements) reveals or indicates saturation effects. Polarization-selective detector elements as described herein can reduce glare that may be due to the polarization of light reflected off or from various surfaces in the field of view, as such glare may create problems for ToF imaging systems by elevating background at certain points in the image (e.g., water surfaces and/or glass where light becomes horizontally polarized, such as wet road surfaces and/or automobile windshields).

Figure 10A:
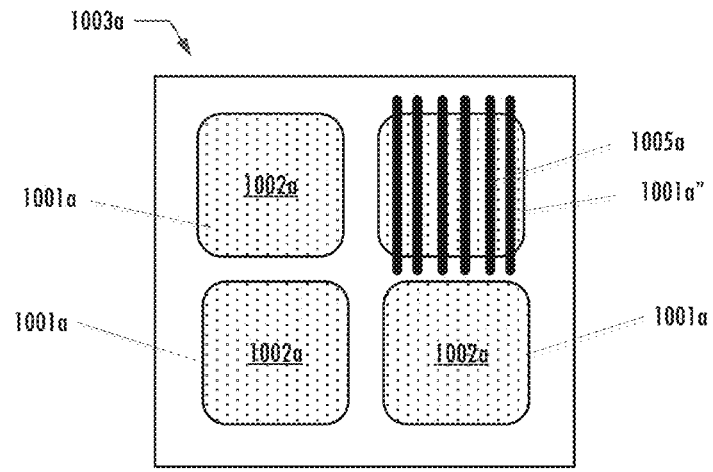
FIGS. 10A and 10B are plan views illustrating examples of compound detector pixels including polarization-selective detector elements in accordance with some embodiments of the present disclosure.
Figure 10B:
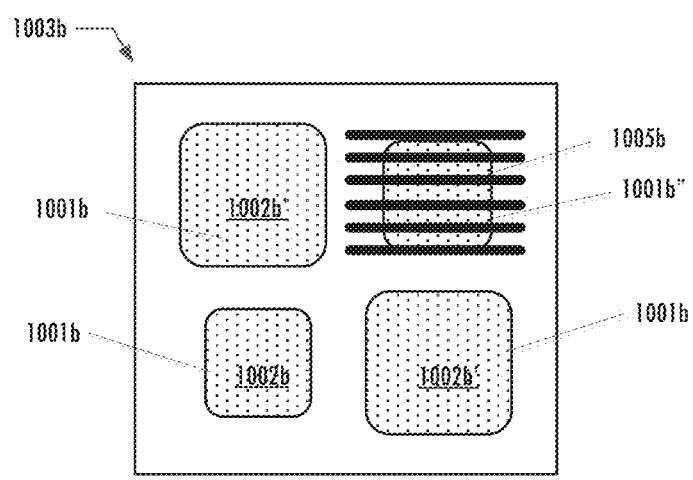

FIGS. 10A and 10B illustrate examples of compound detector pixels 1003a, 1003b including at least one polarization-selective detector element in accordance with some embodiments described herein. As shown in FIGS. 10A and 10B, metallization may be used to create polarization grids 1005a, 1005b over one or more of the SPADs 1001a, 1001b in a compound pixel 1003a, 1003b. In particular, FIG. 10A illustrates a top or plan view of a compound pixel 1003a including four equal-sized SPADs 1001a (i.e., having the same active surface area 1002a) with a vertical polarization grid 1005a overlapping the SPAD 1001a" in the top-right corner of the pixel 1003a. FIG. 10B illustrates a top or plan view of a compound pixel 1003b including four SPADs 1001b having different active surface areas 1002b, 1002b', in particular, two smaller and two larger SPADs 1001b, with a horizontal polarization grid 1005b overlapping the smaller SPAD 1001b" in the top-right corner of the pixel 1003b. It will be understood that the relative number and/or sizes of the detector elements 1001a, 1001b, as well as number and/or relative positions of the detector elements 1001a', 1001b' including the polarization grids 1005a, 1005b in each pixel 1003a, 1003b is illustrated by way of example only, and any combination of SPAD number, sizes, shapes, and polarization grid polarity (or degree angle) are included in embodiments described herein.

Figure 11A:
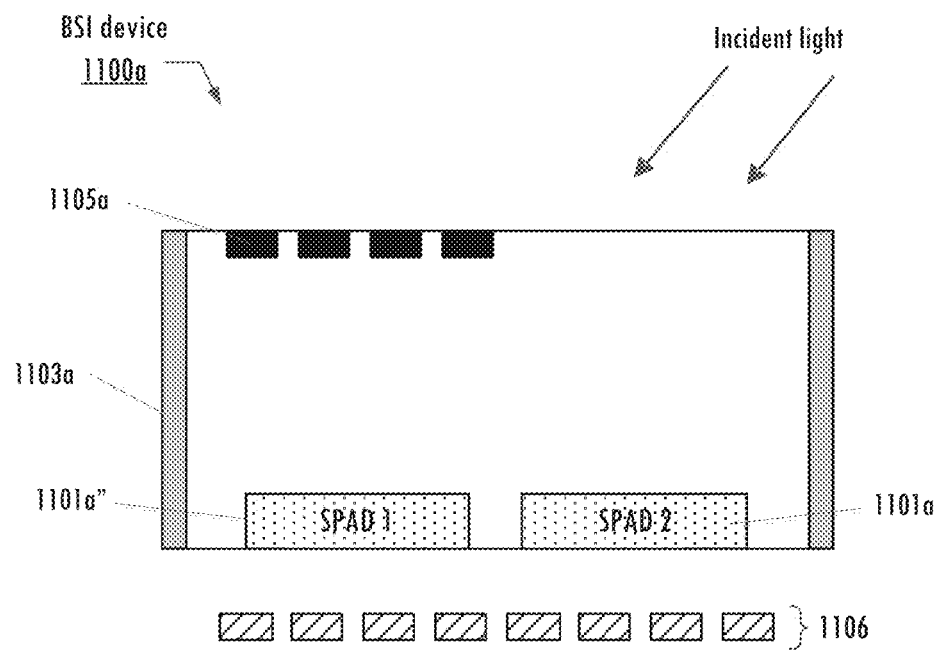
FIG. 11A is a cross-sectional view illustrating an example of a backside illuminated (BSI) device including compound detector pixels with polarization-selective detector elements in accordance with some embodiments of the present disclosure.

The polarization-selectivity of one or more detector elements in a compound detector pixel a may be implemented in various ways in accordance with embodiments of the present disclosure. For example, FIG. 11A is a cross-sectional view illustrating two SPADs 1101a, 1101a" defining a compound detector pixel of a backside illuminated (BSI) device 1100a, where a polarization grid 1105a is provided on a backside or back surface of the pixel 1103a (the light-receiving surface of the pixel 1103a, which is opposite the frontside or front surface including the detector elements 1101a, 1101a"), and only overlapping one of the detector elements 1101a' (SPAD1). That is, the polarization grid 1105a is selectively provided in the incident light path of detector element 1101a", such that detector element 1101a" is polarization selective. The other visible detector element 1101a (SPAD2) does not include the polarization grid 1105a thereon, and thus is non-polarization selective with respect to detection of the incident light on the backside. Metallization 1106 is routed adjacent the frontside of the pixel 1103a, for electrical connectivity to elements of the array and/or other devices.

Figure 11B:
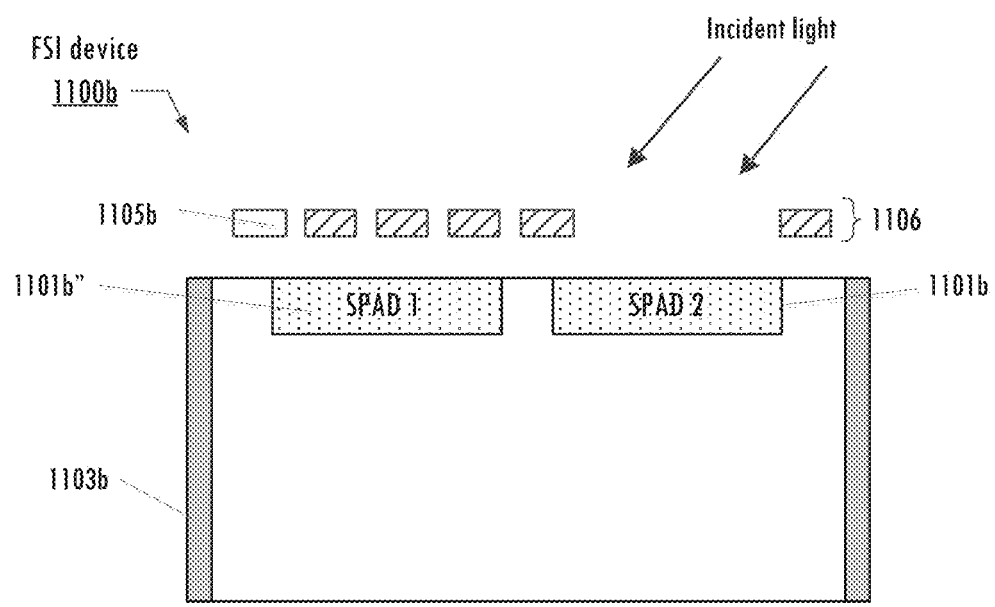
FIG. 11B is a cross-sectional view illustrating an example of a frontside illuminated (FSI) device including compound detector pixels with polarization-selective detector elements in accordance with some embodiments of the present disclosure.

FIG. 11B is a cross-sectional view illustrating two SPADs 1101b, 1101b" defining a compound detector pixel of a frontside illuminated (FSI) device 1100b, where a polarization grid 1105b is provided on a frontside or front surface of the pixel 1103b (the light-receiving surface of the pixel 1103b, which includes the detector elements 1101b), and only overlapping one of the detector elements 1101b"

(SPAD1). That is, the polarization grid 1105*b* is selectively provided in the incident light path of detector element 1101*b*', such that detector element 1101*b*" is polarization selective. The other visible detector element 1101*b* (SPAD2) does not include the polarization grid 1105*b* thereon, and thus is non-polarization selective with respect to detection of the incident light on the frontside. In the example of FIG. 11B, the polarization grid 1105*b* is implemented by the metallization 1106, which is selectively routed along the frontside adjacent the detector element 1101*b*', but arranged or positioned so as not to overlap (or impede the incident light path of) the detector element 1101*b*. That is, the metallization 1106 in FIG. 11B provides both electrical connectivity to elements of the array and/or other devices, as well as the polarization grid 1105*b*. It will be understood that, while not illustrated, color filter and micro-lenses can be fabricated over the polarization grids in both FSI and BSI technology implementations.

FIGS. 12-20 illustrate various compound detector pixels including multiple detector elements per pixel in accordance with various embodiments described herein. Each of the examples shown in FIGS. 12-20 illustrates a single compound detector pixel, with multiple individually selectable or addressable detector elements per pixel. In particular, FIG. 12 illustrates a quad implementation including four detector elements 1201 in one pixel 1203, with each of the four detector elements 1201 having a same size and active surface area 1202. FIG. 13 illustrates a pixel 1303 with four detector elements 1301 per quadrant, such that the pixel 1303 includes 16 detector elements 1301, each having a same size and active surface area 1302. FIG. 14 illustrates a pixel 1403 with a pair of detector elements 1401 per quadrant, such that the pixel 1403 includes an array of eight detector elements 1401, each having a same size and active surface area 1402. FIG. 15 illustrates a ratio-ed quad implementation including two detector elements 1501 per quadrant of a pixel 1503, with the two detector elements 1501 having different sizes and active surface areas 1502, 1502'.

Figure 16:
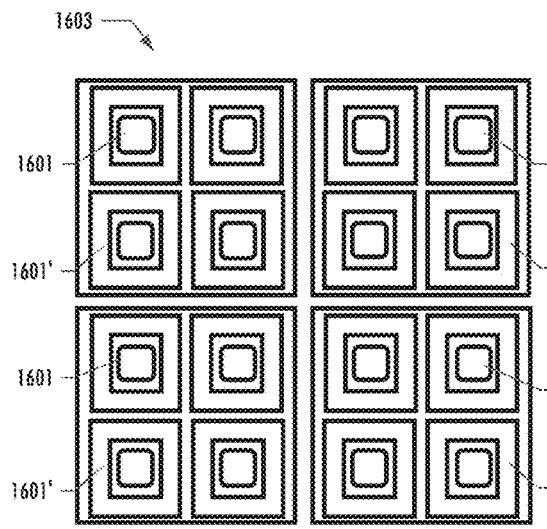
Figure 17:
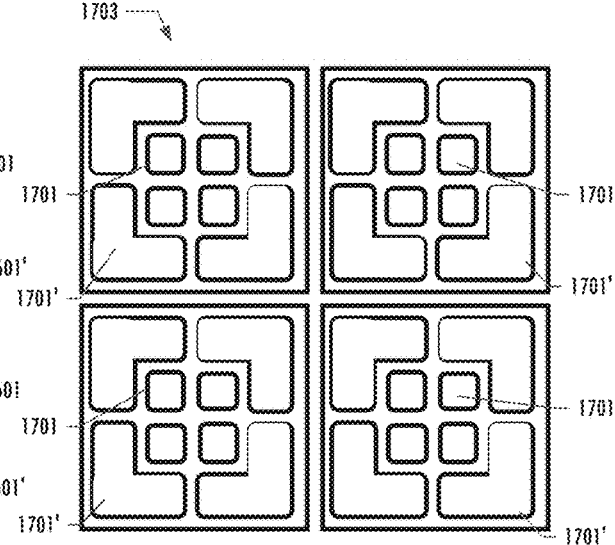

FIGS. 16-20 illustrate compound detector pixel arrangements including multiple detector elements per pixel with one or more centrally-located detector elements that can provide centered sampling. That is, the centrally-located detector elements may be enabled irrespective of whether one or more of the remaining detector elements per pixel are enabled or disabled. In particular, FIG. 16 illustrates a compound detector pixel arrangement 1603 with four detector elements per quadrant, each having a ratio-ed quad arrangement including four larger detector elements 1601' and four smaller detector elements 1601 to provide centered sampling, such that the pixel includes 32 detector elements. FIG. 17 illustrates another compound detector pixel arrangement 1703 with four detector elements per quadrant, each in a ratio-ed quad arrangement including four larger detector elements 1701' at a periphery of each quadrant and four smaller detector elements 1701 arranged centrally in each quadrant to likewise provide centered sampling, with 32 detector elements per pixel.

Figure 18:
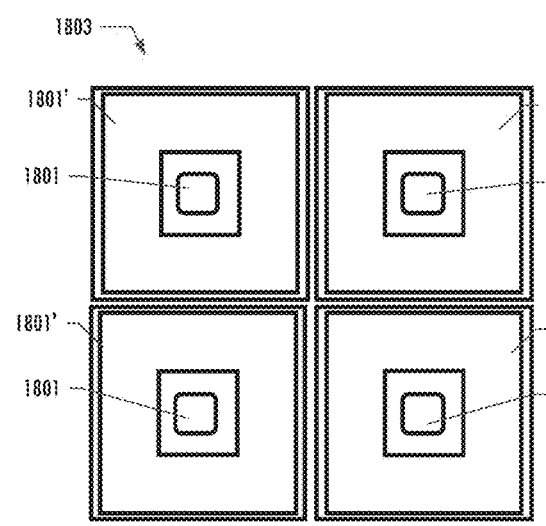
Figure 19:
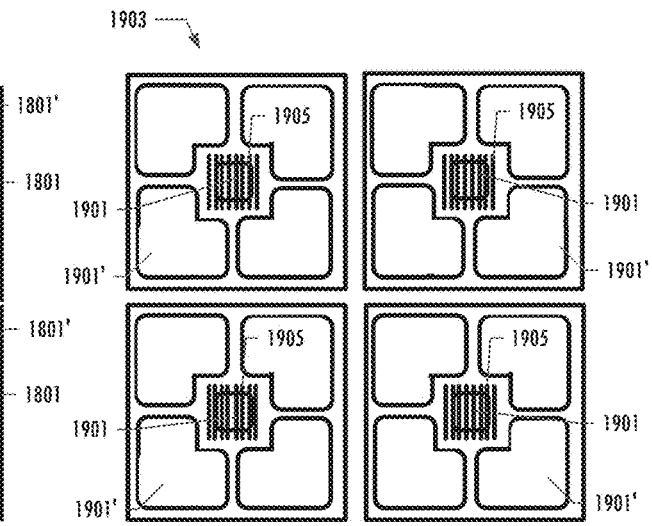
Figure 20:
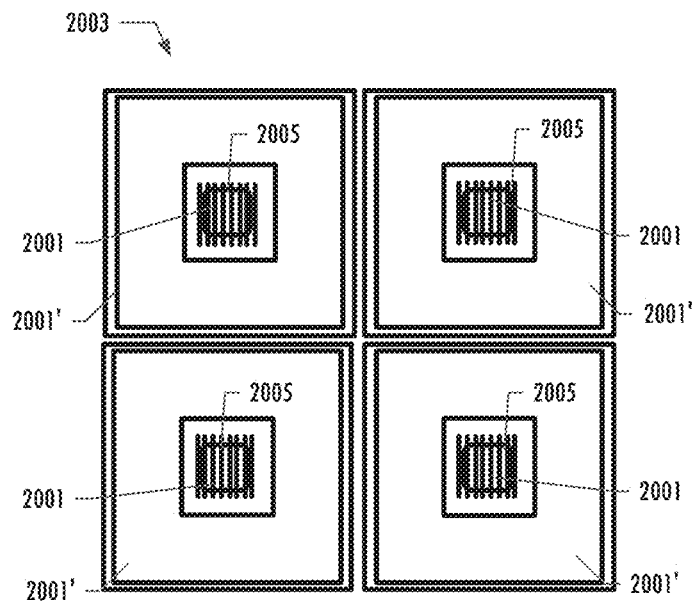

FIG. 18 illustrates a compound detector pixel arrangement 1803 with four detector elements per quadrant, each having a ratio-ed quad implementation similar to FIG. 7, including four larger detector elements 1801' and four smaller detector elements 1801 to provide centered sampling. FIG. 20 illustrates a compound detector pixel arrangement 2003 with four detector elements per quadrant, each having a ratio-ed quad implementation similar to FIG. 18 with four larger detector elements 2001' and four smaller detector elements 2001, where the four smaller detector elements 2001 each include a polarization grid thereon 2005 to provide polarization-selective centered sampling. FIG. 19 likewise includes a polarization grid 1905 on a smaller, centrally located detector element 1901 in each quadrant to provide polarization-selective centered sampling, with four larger detector elements 1901' at peripheral portions of each quadrant of the compound detector pixel 1903.

It will be understood that the example compound detector pixel configurations shown in FIGS. 12-20 are provided by way of illustration rather than limitation, and other configurations are included in the scope of the present disclosure. As such, embodiments described herein may provide selective activation of individually addressable detector elements of a single pixel to provide varying active detection area and/or polarization-selective detection or rejection responsive to varying light conditions, including varying ambient light.

Figure 21:
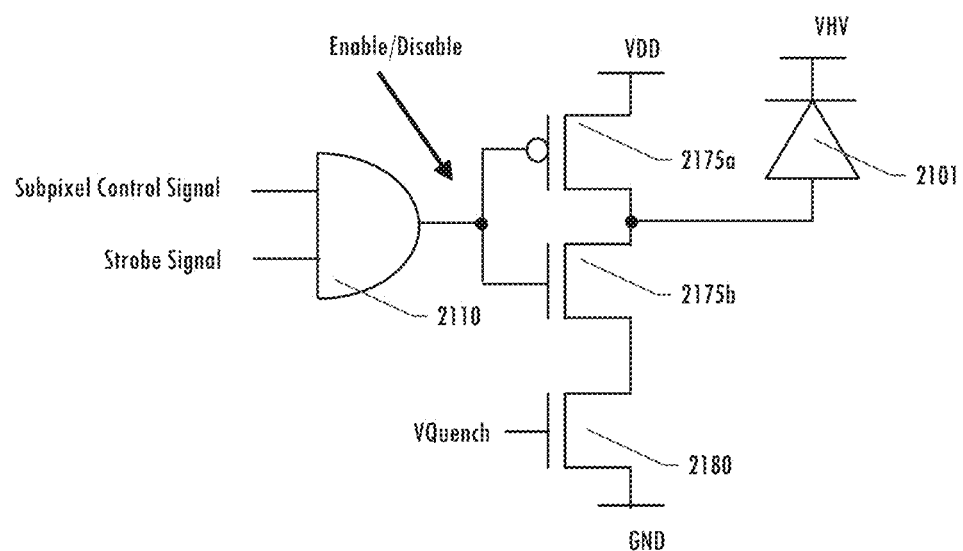
FIG. 21 is a circuit diagram illustrating an example implementation of an enable/disable circuit that may be used to selectively activate subsets of detector elements in a compound pixel in accordance with some embodiments of the present disclosure.

FIG. 21 is a circuit diagram illustrating an example implementation of an enable/disable circuit that may be used to selectively activate subsets of detector elements in a compound pixel responsive to strobe and subpixel control signals in accordance with embodiments described herein. In particular, FIG. 21 illustrates an AND gate 2110 that receives both a subpixel control signal and a strobe signal as described herein to selectively enable or disable one of the SPADs 2101 of a compound pixel by controlling respective gates of transistors 2175*a* and 2175*b*, with reset/quenching by controlling the gate of transistor 2180. In the example of FIG. 21, the subpixel control signal can be local to the pixel (e.g., programmed in a memory in the pixel) or global to the array, with different possible patterns. The subpixel control signal is specific to activate an individual SPAD 2101 in compound pixel, while strobe signal is global and activates the pixel as a whole. That is, in the example of FIG. 21, a SPAD 2101 or other detector element is activated responsive to both the strobe signal and the subpixel control signal. However, it will be understood that this implementation is provided by way of example only, and other implementations may be used in accordance with embodiments described herein.

FIGS. 22A and 23A are circuit diagrams illustrating example implementations of stacked compound detector pixels including two detector elements with different active detection areas that can be selectively enabled/disabled based on the incident light conditions of the operating environment and on desired sensitivity and/or power consumption requirements in accordance with some embodiments of the present disclosure. FIGS. 22B and 23B illustrate plan views of the compound detector pixels of FIGS. 22A and 23A, respectively.

Referring to FIGS. 22A and 22B, a compound detector pixel 2203 includes a smaller-area detector element (illustrated as SPAD 2201) and a larger-area detector element (illustrated as SPAD 2201') in a stacked arrangement. More particularly, as shown in FIG. 22B, the pixel 2203 includes the SPADs 2201, 2201' in a concentric arrangement with the smaller-area SPAD 2201 centrally or concentrically positioned relative to the larger-area SPAD 2201'. As shown in FIG. 22A, the outputs of the SPADs 2201, 2201' are connected to respective quench/processing circuits 2280*a*, 2280*b* by respective transistors 2275*a*, 2275*b* at respective bonding interfaces. The transistors 2275*a*, 2275*b* are configured to electrically connect the outputs of the SPADs 2201, 2201' to the respective quench/processing circuits 2280*a*, 2280*b* responsive to respective subpixel control signals applied to the gate terminals of the transistors 2275*a*, 2275*b*. That is, in the embodiments of FIGS. 22A and 22B, each SPAD 2201 and 2201' operates separately or independently of the other via dedicated control circuits 2275a/2280a and 2275b/2280b, respectively, when enabled by a respective subpixel control signal, regardless of whether both SPADs 2201, 2201' are enabled simultaneously.

Referring to FIGS. 23A and 23B, a compound detector pixel 2303 similarly includes smaller-area and larger-area SPADs 2301 and 2301' (or other detector elements) in a stacked arrangement, more particularly, in a concentric arrangement with the smaller-area SPAD 2301 centrally or concentrically positioned relative to the larger-area SPAD 2301'. As shown in FIG. 23A, the outputs of the SPADs 2301, 2301' are connected to a shared quench/processing circuit 2380 by respective transistors 2375a, 2375b at respective bonding interfaces. The transistors 2375a, 2375b are configured to electrically connect the outputs of the SPADs 2301, 2301' to the shared quench/processing circuit 2380 responsive to respective subpixel control signals applied to the gate terminals of the transistors 2375a, 2375b. In the embodiments of FIGS. 23A and 23B, if either or any of the two SPADs 2301, 2301' is enabled, the enabled SPAD can operate independently of the disabled SPAD. If both SPADs 2301, 2301' are enabled simultaneously, the respective outputs of the SPADs 2301, 2301' are combined or collectively processed by the quench/processing circuit 2380. That is, the two SPADs 2301, 2301' may be operated in combination e.g., as one device. The connection and/or control schemes illustrated by way of example in FIGS. 22A and 23A may be applied to any of the compound pixels and/or detector element subsets described herein.

Embodiments of the present disclosure may be used in conjunction with operations for varying the number of readouts based on detection thresholds, as described for example in U.S. patent application Ser. No. 16/733,463 entitled "High Dynamic Range Direct Time of Flight Sensor with Signal-Dependent Effective Readout Rate" filed Jan. 3, 2020, the disclosure of which is incorporated by reference herein. For example, a smaller subset of the detector elements or detector pixels may be activated (e.g., responsive to respective strobe signals and subpixel control signals) in response to one or more readouts that are based on fewer cycles of the emitter signal (indicating a closer and/or more reflective target), or a larger subset of the detector elements or detector pixels may be activated in response to one or more readouts that are based on more cycles of the emitter signal (indicating farther and/or less reflective targets).

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment", "one embodiment" and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts.

The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

It will be understood that when an element is referred to or illustrated as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation, the scope of the present invention being set forth in the following claims.

The invention claimed is:

1. A Light Detection And Ranging (LIDAR) detector circuit, comprising:
  a plurality of detector pixels, a respective detector pixel of the detector pixels comprising a plurality of detector elements; and
  at least one control circuit configured to provide one or more detector control signals that selectively activate one or more of the detector elements of the respective detector pixel to define a first active detection area comprising a first subset of the detector elements for a first image acquisition, and a second active detection area comprising a second subset of the detector elements for a second image acquisition,
  wherein the first and second subsets comprise different quantities of the detector elements, and/or wherein the first and second subsets comprise ones of the detector elements having different surface areas.

2. The LIDAR detector circuit of claim 1, wherein the at least one control circuit is configured to provide the one or more detector control signals for the first and second image acquisitions responsive to first and second intensities of incident light, respectively.

3. The LIDAR detector circuit of claim 2, wherein the first intensity is greater than the second intensity, and wherein the first active detection area is less than the second active detection area.

4. The LIDAR detector circuit of claim 2, wherein at least one of the detector elements of the first and/or second subsets is polarization-selective.

5. The LIDAR detector circuit of claim 4, wherein the at least one of the detector elements comprises a polarizer thereon.

6. The LIDAR detector circuit of claim 5, wherein the polarizer comprises metallization defining a grid pattern.

7. The LIDAR detector circuit of claim 1, wherein the at least one control circuit is configured to provide the one or more detector control signals for the first and second image acquisitions based on first and second distance ranges corresponding thereto, respectively.

8. The LIDAR detector circuit of claim 7, wherein the first distance range comprises a closer distance to the respective detector pixel than the second distance range, and wherein the first active detection area is less than the second active detection area.

9. The LIDAR detector circuit of claim 1, wherein the first and second image acquisitions comprise respective subframes of an image frame, and wherein the one or more detector control signals comprise strobe signals that are configured to activate the detector pixels to detect photons incident thereon for the respective subframes.

10. The LIDAR detector circuit of claim 9, wherein the one or more detector control signals comprise subpixel control signals that are configured to connect respective outputs of the one or more of the detector elements of the respective detector pixel to the at least one control circuit.

11. The LIDAR detector circuit of claim 1, wherein the at least one control circuit is configured to provide the one or more detector control signals to activate at least one of the detector elements of the first and/or second subsets independent of the first and second image acquisitions.

12. The LIDAR detector circuit of claim 1, wherein each of the detector pixels comprises a respective plurality of detector elements, and wherein the at least one control circuit is configured to provide the one or more detector control signals to each of the detector pixels for the first and second image acquisitions.

13. A method of operating a Light Detection And Ranging (LIDAR) detector circuit, the method comprising:
  performing, by at least one processor that is coupled to a plurality of detector pixels, operations comprising:
  providing one or more detector control signals that selectively activate one or more detector elements of a respective detector pixel of the detector pixels to define a first active detection area comprising a first subset of the detector elements for a first image acquisition, and a second active detection area comprising a second subset of the detector elements for a second image acquisition,
  wherein the first and second subsets comprise different quantities of the detector elements, and/or wherein the first and second subsets comprise ones of the detector elements having different surface areas.

14. A Light Detection And Ranging (LIDAR) detector circuit, comprising:
  an array of detector pixels, a respective detector pixel of the array comprising a plurality of detector elements; and
  at least one control circuit configured to dynamically adjust a sensitivity and/or power consumption of the respective detector pixel by selectively activating different subsets of the detector elements for respective image acquisitions based on incident light conditions and/or distance ranges associated with the respective image acquisitions,
wherein the different subsets comprise different quantities of the detector elements, and/or wherein the different subsets comprise ones of the detector elements having different surface areas.

15. The LIDAR detector circuit of claim 14, wherein the detector elements of the respective detector pixel comprise at least one polarization-selective detector element, and wherein the at least one control circuit is configured to dynamically adjust the sensitivity and/or power consumption of the respective detector pixel by selectively activating the at least one polarization-selective detector element for the respective image acquisitions based on the incident light conditions associated therewith.

16. The LIDAR detector circuit of claim 15, wherein the at least one polarization-selective detector element comprises a polarizer thereon, wherein the polarizer comprises metallization defining a grid pattern.

17. The LIDAR detector circuit of claim 14, wherein the at least one control circuit is configured to activate at least one of the detector elements of the respective pixel independent of the incident light conditions and/or distance ranges associated with the respective image acquisitions.

18. A method of operating a Light Detection And Ranging (LIDAR) detector circuit, the method comprising:
performing, by at least one processor that is coupled to an array of detector pixels, operations comprising:
dynamically adjusting a sensitivity and/or power consumption of a respective detector pixel of the array by selectively activating different subsets of detector elements of the respective detector pixel for respective image acquisitions based on incident light conditions and/or distance ranges associated with the respective image acquisitions,
wherein the different subsets comprise different quantities of the detector elements, and/or wherein the different subsets comprise ones of the detector elements having different surface areas.

19. The LIDAR detector circuit of claim 1, wherein the LIDAR detector circuit is configured to be coupled to an autonomous vehicle and oriented relative to an intended direction of travel of the autonomous vehicle.

* * * * *